United States Patent [19]
Khandkar et al.

[11] Patent Number: 5,856,035
[45] Date of Patent: Jan. 5, 1999

[54] ELECTRICAL CONNECTOR APPARATUS FOR PLANAR SOLID OXIDE FUEL CELL STACKS

[75] Inventors: Ashok C. Khandkar, Salt Lake City; Singaravelu Elangovan, Sandy, both of Utah

[73] Assignee: Gas Research Institute, Chicago, Ill.

[21] Appl. No.: 810,975

[22] Filed: Feb. 27, 1997

[51] Int. Cl.[6] .................................................. H01M 8/04
[52] U.S. Cl. ............................................... 429/32; 429/34
[58] Field of Search .................................... 429/30, 32, 33, 429/34, 38, 39

[56] References Cited

U.S. PATENT DOCUMENTS

| | | | |
|---|---|---|---|
| 4,002,493 | 1/1977 | Warszawski | 429/26 |
| 4,532,192 | 7/1985 | Baker et al. | 429/19 |
| 4,567,117 | 1/1986 | Patel et al. | 429/19 |
| 4,666,798 | 5/1987 | Herceg | 429/12 |
| 4,728,584 | 3/1988 | Isenberg | 429/31 |
| 4,816,036 | 3/1989 | Kotchick | 29/623.3 |
| 4,883,497 | 11/1989 | Claar et al. | 29/623.5 |
| 5,009,763 | 4/1991 | Hise | 204/255 |
| 5,035,961 | 7/1991 | Riley | 429/30 |
| 5,178,970 | 1/1993 | Jansing et al. | 429/38 |
| 5,198,312 | 3/1993 | Irino et al. | 429/26 |
| 5,270,131 | 12/1993 | Diethelm | 429/34 |
| 5,387,476 | 2/1995 | Koch et al. | 429/12 |

*Primary Examiner*—Anthony Skapars
*Attorney, Agent, or Firm*—Factor and Shaftal

[57] ABSTRACT

An apparatus for collecting electrical current from individual fuel cell stacks in a solid oxide fuel cell is provided, in which the current collectors are protected from oxidation through advantageous placement in non-oxidizing surroundings. Fuel cell module configurations employing and taking advantage of the current collecting apparatus are also provided.

17 Claims, 4 Drawing Sheets

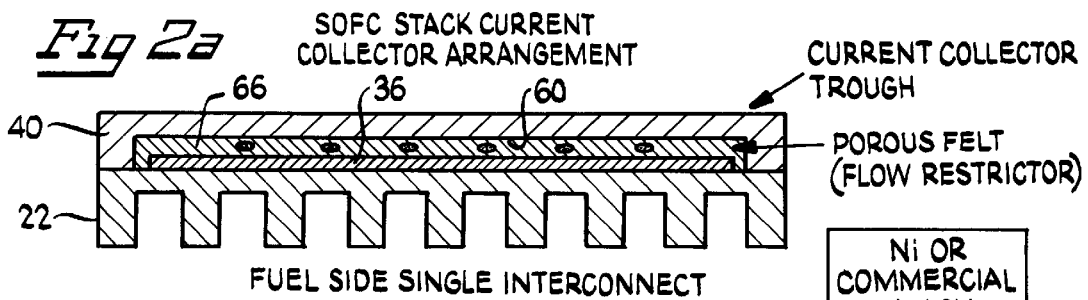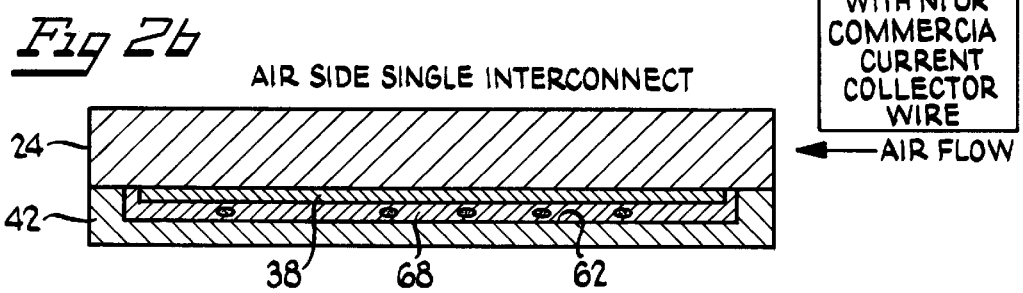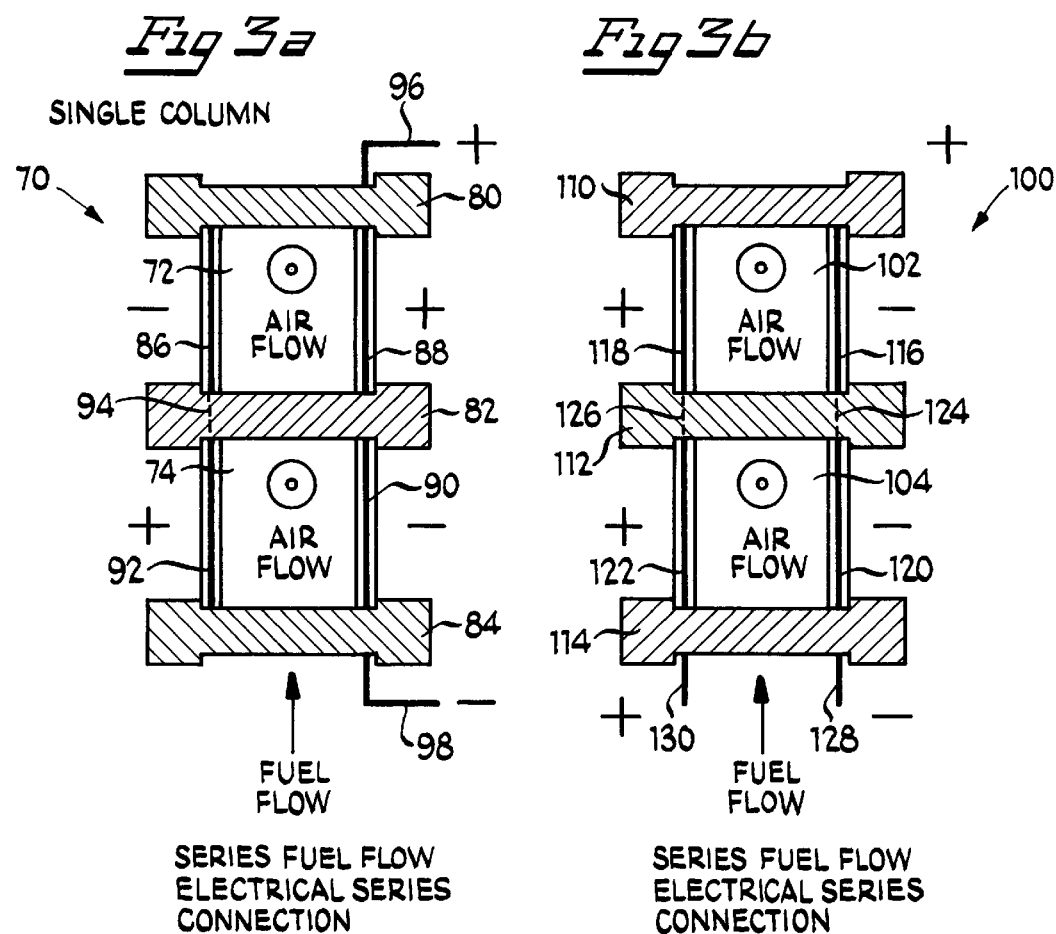

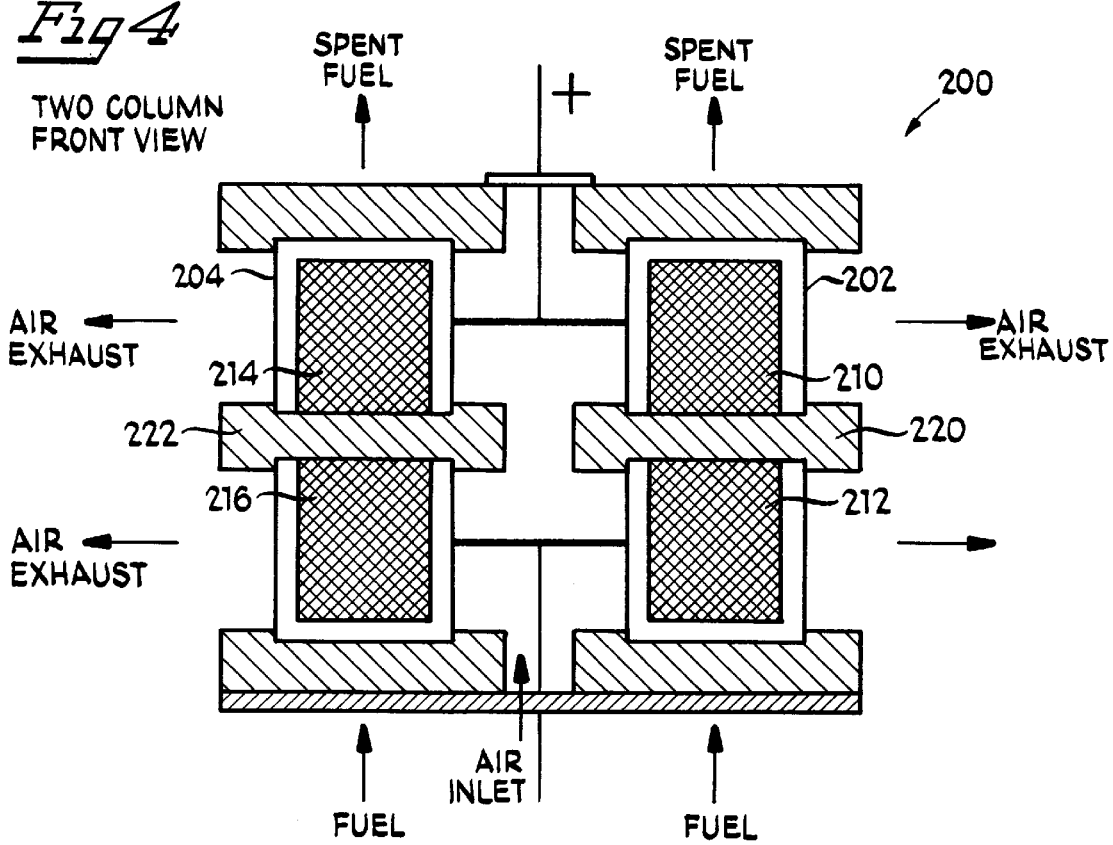
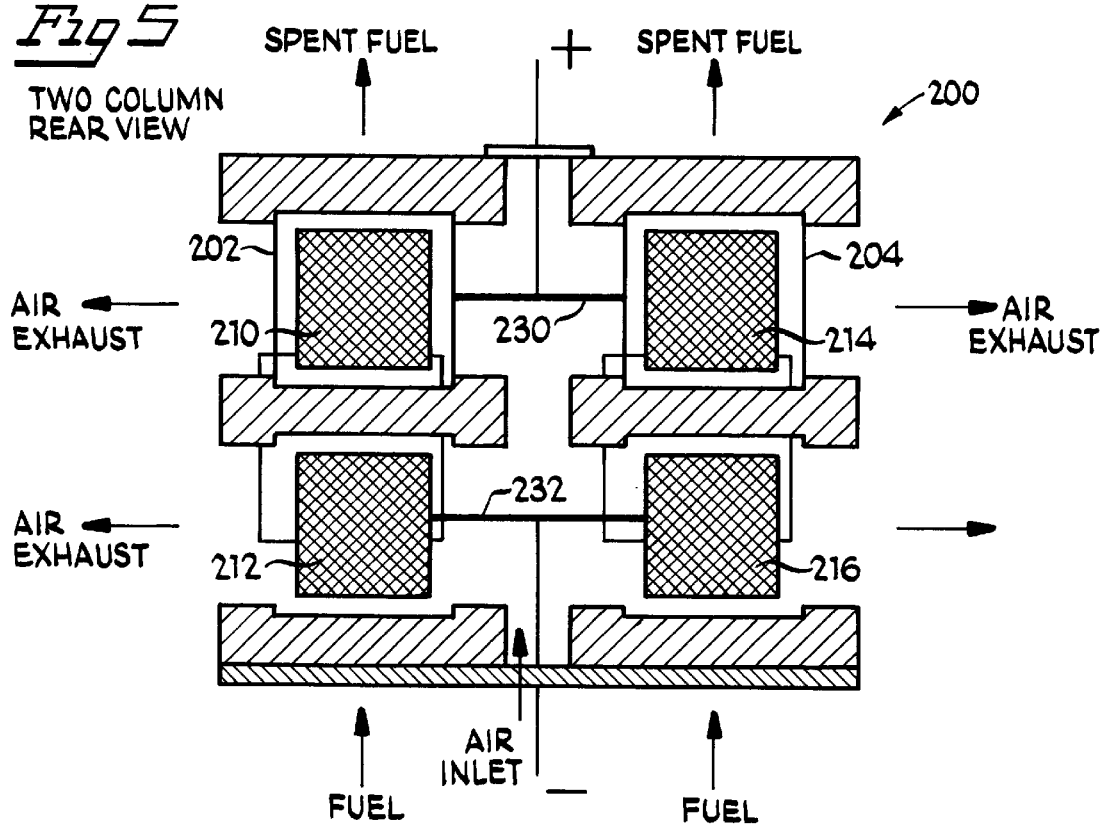

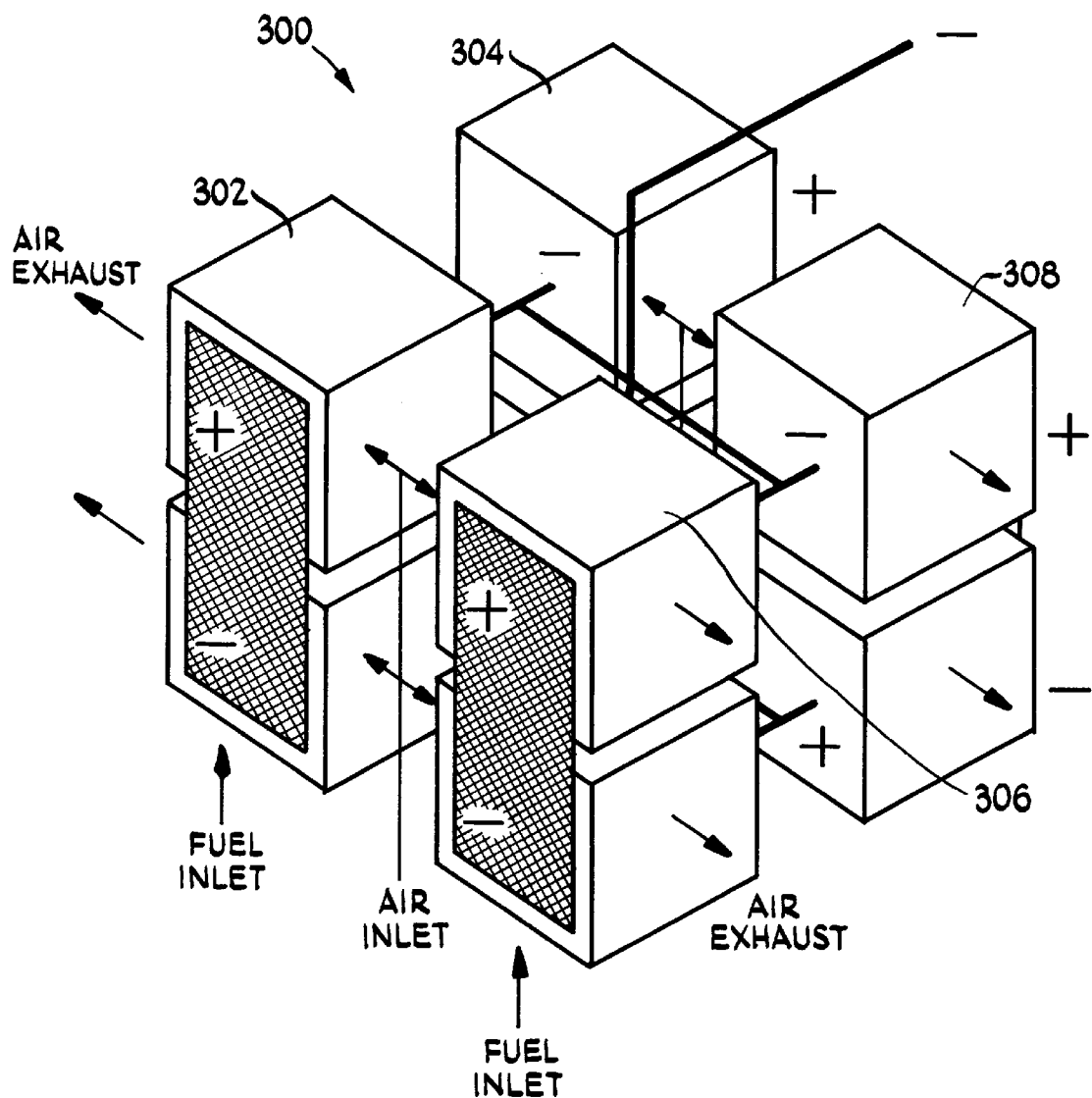

ELECTRICAL CONNECTOR APPARATUS FOR PLANAR SOLID OXIDE FUEL CELL STACKS

This application depends from and claims priority, under 35 U.S.C. § 119(e) of Provisional Application Ser. No. 60/012,484, filed Feb. 29, 1996.

BACKGROUND OF THE INVENTION

1. The Field of the Invention

The present invention relates to the field of fuel cell apparatus, and in particular, to electrical connector apparatus for planar solid oxide fuel cell (SOFC) stacks, and in particular to current collector apparatus for removal of current from such SOFC stacks.

2. The Prior Art

The removal of current by typical prior art current collector apparatus in multicell SOFC stacks is accomplished by attaching current collectors to the end interconnects of the multicell on surfaces, at least some of which are conventionally exposed to air (or an oxidizing) atmosphere. Such prior art apparatus include U.S. Pat. No. 5,270,131 to Diethelm et al.

Current collection efficiency is dependent on the bulk electronic conductivity of the current collector as well as the interfacial contact resistance between the current collector and the stack end plates. The current collectors for typical planar SOFCs are typically made of precious metal mesh or foil, typically of platinum or silver-palladium alloy. The use of precious metals, for their oxidation resistance properties, has the potential drawback of being costly.

In order to avoid the cost of using precious metals, other oxidation resistant alloys have been considered. However, current collectors made of such alloys achieve oxidation resistance through the formation of an electrically insulating layer at the collector surface. Accordingly, the useful life of such collectors may be limited. In addition, advanced bonding processes are required to attach the current collectors to the stack end interconnects, in order to prevent or reduce the build up of an insulating oxide layer at the interfaces of the collectors to the interconnects.

Other prior art apparatus have been configured to go to the extreme of immersing the entire module or stack in a reducing atmosphere (such as fuel gas) except those portions which must be exposed to oxidizing atmosphere. Irino et at., U.S. Pat. No. 5,198,312 is an example of such a configuration, and even in Irino et al. '312, it is only the end collectors, and not the individual cell or plate collectors, which are so protected.

It would be desirable to provide an SOFC configuration, particularly for planar SOFCs, in which the current collectors for individual cells or plates are protected from oxidizing effects.

It would additionally be desirable to provide an SOFC configuration, particularly for planar SOFCs, and especially for multistack SOFC modules, in which series and parallel current collection paths are provided to provide robustness to the multistack module, wherein if one stack experiences current collection problems, other collection pathways are provided, so that the overall module can remain operational.

SUMMARY OF THE INVENTION

The present invention is directed to an improved solid oxide fuel cell (SOFC) configuration, and in particular, to an improved current collector construction for use in such fuel cells.

According to a preferred embodiment of the invention, a SOFC is provided comprising at least one substantially planar electrolyte, which may be of known construction and material, with suitable anode and cathode electrodes positioned on opposite sides of the electrolyte. Means are provided for directing the flow of fuel gas and oxidizing gas across the opposite sides of the at least one electrolyte, thereby enabling the creation of an electrical potential across the at least one electrolyte from one side to the other.

In a preferred embodiment of the invention, the means for directing the flow of fuel gas and oxidizing gas comprise electrically conductive interconnector members having one or more fluid flow passages, defined by two or more fluid directing members, arranged on one or more sides of the interconnector members. Where two or more electrolyte members are provided, between adjacent electrolyte members, the interconnector members have fluid flow passages on each side, preferably running in perpendicular directions, and substantially fluidly isolated from one another.

Those interconnector members not between adjacent electrolyte members, that is, those interconnector members situated at opposite ends of the fuel cell, have fluid flow passages on their sides facing their respective electrolyte members, and substantially planar faces on their sides opposite from their respective electrolyte members.

Electrical current collector members are positioned on the substantially planar faces of the end interconnector members. To protect the electrical current collector members, cover members are positioned over and surrounding the current collector members, to isolate the current collector members from any oxidizing gas flows. To further protect the current collector members, gas flow passages are provided in the sides of the cover members facing the substantially planar surfaces, and a non-oxidizing gas, such as a reducing gas such as the fuel gas for the fuel cell, is directed through the gas flow passages in the cover members. Flow control members, such as porous members, may be provided in the gas flow passages in the cover members, to maintain a high pressure drop so that the majority of the fuel gas passes through the passages adjacent the electrolyte to support the electrochemical reactions.

The construction of the present invention enables non-exotic, less expensive, merely high temperature oriented materials, such as relatively conventional nickel based metals and alloys, to be used for the electrical current collector members.

The invention comprises a fuel cell apparatus, such as a solid oxide fuel cell apparatus, including at least one electrolyte member having at least two sides, including two opposed sides; means for directing a flow of fluid across at least one of the two opposed sides of the at least one electrolyte member; means, operably associated with the at least one electrolyte member, for conducting electrical current to positions physically removed from the at least one electrolyte member, in isolation from the fluid flow passing over at least one of the two opposed sides of the at least one electrolyte member; means for collecting electrical current from the means for conducting electrical current, operably associated with the means for conducting electrical current; and means, operably associated with the means for collecting electrical current, for protecting the means for collecting electrical current.

In a preferred embodiment of the invention, wherein at least one electrolyte member is a substantially planar electrolyte member, the means for directing a flow of fluid over at least one of the two opposed sides of the electrolyte member comprises at least one flow directing member operably positioned adjacent to at least one of the two opposed sides of the electrolyte member, having one or more fluid flow passages arranged therein, one or more of the one or more fluid flow passages opening onto the at least one side of the electrolyte member, so as to enable contact between the flow of fluid and at least one of the two opposed sides of the electrolyte member.

In a preferred embodiment of the invention, the means, operably associated with the at least one electrolyte member, for conducting electrical current to positions physically removed from the at least one electrolyte member, in isolation from the fluid flow passing over at least one of the two opposed sides of the at least one electrolyte member, comprises at least one electrically conducting member, operably disposed in contact with one of the two sides of the at least one electrolyte member, and having at least one surface region disposed in spaced relation to the one of the two sides of the at least one electrolyte member. The at least one surface region is further isolated from the flow of fluid across the one side of the at least one electrolyte member.

Preferably, the means for collecting electrical current comprises at least one current collector member operably disposed adjacent to and in electrical contact with at least one surface region of the electrically conducting member. The means, operably associated with the means for collecting electrical current, for protecting the means for collecting electrical current comprises means for covering and substantially enclosing the at least one current collector member, so as to substantially preclude exposure of the at least one current collector member to oxidizing fluid.

The means for covering and substantially enclosing the at least one current collector member further comprises means for directing flow of a non-oxidizing fluid over the at least one current collector member.

The means for covering and substantially enclosing the at least one current collector member further comprises at least one cover member, having a fluid flow channel operably disposed on one side thereof, the at least one cover member being operably disposed substantially adjacent to the at least one surface region of the at least one electrically conducting member, with the side of the at least one cover member having the flow channel disposed therein facing the at least one surface region, such that the at least one current collector member is substantially received within the at least one fluid flow channel.

The at least one cover member is preferably fabricated from an electrically conductive material.

The at least one current collector member is preferably fabricated from a metal material including nickel.

The means for directing a flow of fluid over at least one of the two opposed sides of the at least one electrolyte member and the means for conducting electrical current to positions physically removed from the at least one electrolyte member further comprise at least one monolithically fabricated electrically conducting interconnector member, having a first side having two or more flow directing members associated therewith to define at least one fluid flow passage disposed thereon the first side, and at least one surface region operably disposed on a second side substantially opposite the first side.

At least one electrically conducting interconnector member is preferably operably arranged relative to the at least one electrolyte member such that the first side of the at least one electrically conducting member is positioned facing one of the two sides of the at least one electrolyte member, the two or more flow directing members being in electrically conducting contact with the one of the two sides of the at least one electrolyte member.

The fuel cell apparatus according to the present invention further comprises means for regulating the flow of fluid through the at least one fluid flow channel in the at least one cover member.

At least one electrolyte member includes at least two electrolyte members, further comprising at least one electrically conductive interconnector member operably disposed between the at least two electrolyte members.

The present invention also includes a current collector apparatus for collecting the electrical current generated by the one or more electrolytes in a fuel cell, such as a solid oxide fuel cell, which is powered by supplies of fuel fluid and oxidizing fluid directed to opposed sides of the one or more electrolytes.

The current collector apparatus comprises at least one current collector member, operably disposed in electrically conductive relation to at least one side of at least one of the one or more electrolytes in the fuel cell; and means, operably associated with the at least one current collector member, for shielding the at least one current collector member from contact with oxidizing fluid.

In a preferred embodiment of the invention, wherein the fuel and oxidizing fluids are directed past the sides of the at least one electrolyte members by fluid directing members extending along the sides of the at least one electrolyte member, the means for shielding the at least one current collector member comprises a substantially planar member, having a surface region thereon, and operably disposed between the fluid directing members and the at least one current collector member, with the at least one current collector member positioned adjacent to and in electrical contact with the surface region, so as to substantially contain the fluid flowing past the sides of the at least one electrolyte member, the fluid directing members and the substantially planar member being electrically conductive.

The means for shielding the at least one current collector member further comprises at least one cover member, operably configured so as to be positioned substantially adjacent to and over the surface region and the at least one current collector member positioned thereon, so as to substantially surround same.

At least one cover member has a fluid passage disposed therein for receiving and surrounding the at least one current collector member and enabling the passage of a non-oxidizing fluid therein. Means for regulating fluid flow are operably disposed within the fluid passage in the at least one cover member.

BRIEF DESCRIPTION OF THE DRAWINGS

FIG. 2a is a side sectional elevation of the fuel side collector configuration according to the embodiment of FIG. 1;

FIG. 2b is a side sectional elevation of the air side collector configuration according to the embodiment of FIG. 1;

FIG. 3a is a schematic illustration of a single column SOFC, having two fuel cell stacks connected electrically in series and having fuel flow in series through the two fuel cell stacks;

FIG. 3b is a schematic illustration of a single column SOFC, having two fuel cell stacks connected electrically in parallel, and having fuel flow in series through the two fuel cell stacks;

FIG. 4 is a front view schematic illustration of a two column SOFC apparatus having serial fuel flow in each column, and indicating the current take offs from the columns;

FIG. 5 is a rear view schematic illustration of a two column SOFC apparatus having serial fuel flow in each column, and indicating the current take offs from the columns;

FIG. 6 is a perspective schematic illustration of a four column SOFC and showing in particular, the current take offs from the columns.

BEST MODE FOR PRACTICING THE INVENTION

Figure 1:
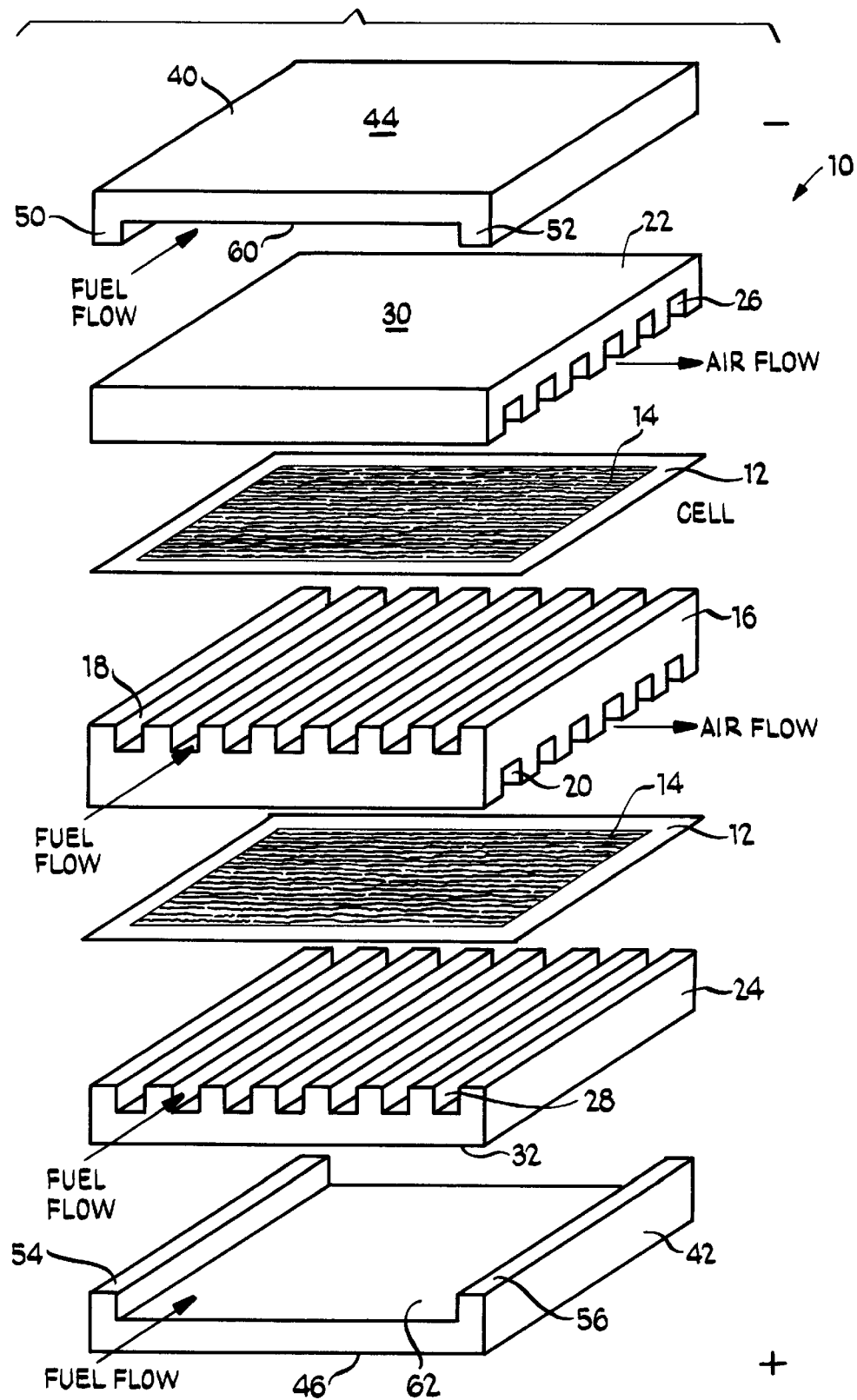
FIG. 1 is an exploded perspective view of a preferred SOFC stack configuration according to a preferred embodiment of the present invention.

While this invention is susceptible of embodiment in many different forms, there is shown in the drawings and will be described in detail herein, a preferred embodiment, with the understanding that the present disclosure is to be considered as an exemplification of the principles of the invention, and is not intended to limit the invention to the embodiment illustrated.

The cell structure and current collector arrangement of the present invention maintains fuel atmosphere in the current collector regions for the individual cells. The low oxygen activity resulting from this arrangement enables the use of materials, such as nickel metals or high temperature alloys compatible with the operating temperatures of the SOFC apparatus, avoiding the use of exotic and possibly costly precious metal collectors or oxidation resistant alloys.

An individual current collector according to the present invention may be configured as a mesh, a foil, or a compliant felt, for combinations of these structures, with bus bars, for collection of current from several cells or plates, made of like materials, connected to the individual cell current collectors. It is not necessary that the bus bars themselves be totally immersed in a reducing atmosphere (such as fuel gas), as in some prior art configurations as previously mentioned. If the attachment between the individual collectors and the bus bars is made in a fuel atmosphere region, using high temperature alloys, extension of the bus bars into an oxidizing atmosphere will not appreciably affect current collection, since, while the exterior surfaces of the bus bars may develop an insulating oxide film, the cores of the bars will be protected and remain conductive.

FIGS. 1, 2a and 2b illustrate a fuel cell stack 10 according to a preferred embodiment of the present invention. A housing, not shown, but which may be of otherwise conventional configuration, may be provided to support and surround the illustrated elements of stack 10, in an insulated manner, and will be suitably provided with fuel and air inlets as necessary.

A plurality of electrolytes 12 are provided, which are preferably constructed of zirconia, although other suitable known electrolyte materials may be employed. To one face of each electrolyte, a cathode 14, preferably constructed of lanthanum manganite is attached. To the opposite face of each electrolyte (on the underside of electrolytes 12, as illustrated in FIG. 1 and therefore not visible in FIG. 1), an anode, preferably fabricated of a nickel cermet material, is attached.

Electrolytes 12 are connected in electrical series by electrically conductive bipolar interconnects 16, preferably made of lanthanum chromite ceramic material, although other suitable materials may be employed. Interconnects 16 have a set of fuel channels 18 provided on one side, and a set of air channels 20, extending perpendicular to the direction of fuel channels 18, on the other side.

Single flow end interconnects 22, 24, which likewise are preferably fabricated from electrically conductive lanthanum chromite ceramic material, are positioned at opposite ends of the stack 10 and have one set of flow channels 26 or 28, respectively, on one side, and a planar surface 30 or 32, respectively, on the other side. End interconnect 22 allows only air flow through channels 26, and is in contact with cathode 14 on electrolyte 12 at one end of the stack 10. End interconnect 24 allows only fuel flow through channels 28 and is in contact with the anode (not shown) on electrolyte 12 at the other end of the stack 10.

Current collectors 36, 38 (not shown in FIG. 1, see FIGS. 2a and 2b) are attached to planar surfaces 30, 32, respectively, of end interconnects 22, 24, respectively, for removal of current from individual fuel cell stack 10. In the embodiment of FIGS. 1, 2a and 2b, additional current collector trough structures 40, 42 are attached to the ends of stack 10. Trough structures 40, 42 are provided with flat surfaces 44, 46, and ribs 50 and 52, and 54 and 56, respectively, which create cavities 60, 62, respectively.

Ribs 50 and 52, and 54 and 56, are in contact with the planar surfaces 30, 32 respectively of end interconnects 22, 24 respectively. Ribs 50 and 52, and 54 and 56, extend parallel to the direction of fuel or air flow in cavities 60 or 62, respectively.

Current collector 36 attached to planar surface 30 resides in cavity 60 of trough structure 40 and is exposed only to fuel atmosphere flowing between end interconnect 22 and trough structure 40. Current collector 38 attached to planar surface 32 resides in cavity 62 of trough structure 42 and is exposed only to fuel atmosphere flowing between end interconnect 24 and trough structure 42. In the remaining gaps in cavities 60, 62, porous felt members 66, 68, may be provided, to act as flow restrictors for the fuel flows in cavities 60, 62. The felt members preferably are fabricated from alumina or zirconia felt. The porosity of the felt members 66, 68, allow a small bleed flow of the fuel through cavities 60, 62, to maintain an oxygen-poor fuel atmosphere over current collectors 36, 38. Preferably, the porosity and pore size of felt members 66, 68 are so selected that the pressure drop through felt members 66, 68 is relatively high, compare to the pressure drop through the fuel channels 18 and 28 of interconnects 16 and 24, respectively, so that most of the fuel being provided to stack 10 is prompted to flow through fuel channels 18, 28 for maintenance of the electrochemical reactions. Since current collectors 36, 38 remain in the reducing atmosphere of the fuel flows, commercial metals or alloys can be used for fabrication of the current collectors 36, 38, without problems related to oxidation of the collectors. Nickel-based metals preferably may be used. Collectors 36, 38 may be formed from solid blocks, metal felt, mesh or screens, or combinations thereof. Current collector wires (not shown) may be attached to collectors 36, 38, and extended outwardly of the housing, such as through an insulated tube, or, for example, through the cold fuel inlet tube, to connect with bus bars for collecting the current from several stacks.

In a preferred embodiment of the invention, interconnectors 16, 22, 24, 40 and 42 preferably are monolithic structures, but may be fabricated from multiple pieces, so long as the multiple pieces of each interconnector are all arranged in a gas-tight relationship with each other, and are electrically conductive.

FIG. 3a illustrates a single column module 70, having two fuel cell stacks 72, 74 arranged in electrical series therein. Each individual stack 72, 74, may have a configuration substantially identical to stack 10, as illustrated in FIGS. 1, 2a and 2b. Each such stack 72, 74, will be oriented such that, as illustrated in FIG. 3a, fuel flow through stacks 72, 74, will be parallel to the plane of the drawing, while air flow through stacks 72, 74 will be perpendicular to the plane of the drawing, and toward the viewer.

Stacks 72, 74 are physically and electrically separated by spacer structures 80, 82, 84, within a housing (not shown). Stack 72 is provided with collectors 86, 88 (schematically illustrated in FIG. 3a), which correspond to collectors 36 and 38, respectively, of FIGS. 1, 2a and 2b. Stack 74 is oriented in the opposite direction as stack 72, and is provided with collectors 90, 92, which correspond to collectors 36, 38, respectively, of FIGS. 1, 2a and 2b. In order to connect stacks 72, 74 in series, collector 86 is electrically connected to collector 92, by a suitable electrical connecting element 94, which may be a high temperature metal connecting wire or rod, fabricated, for example, from nickel material. Collectors 88 and 90 are, in turn, connected to electrical leads 96, 98, which connect stack 70 to a current take off or to other stacks (not shown in FIG. 3a).

FIG. 3b illustrates a single column module 100, having two fuel cell stacks 102, 104, arranged electrically parallel to each other. Each individual stack 102, 104, may have a configuration substantially identical to stack 10, as illustrated in FIGS. 1, 2a and 2b. Each such stack 102, 104, will be oriented such that, as illustrated in FIG. 3b, fuel flow through stacks 102, 104, will be parallel to the plane of the drawing, while air flow through stacks 102, 104, will be perpendicular to the plane of the drawing, and toward the viewer.

Stacks 102, 104, are physically and electrically separated by spacer structures 110, 112, 114, within a housing (not shown). Stack 102 is provided with collectors 116, 118, (schematically illustrated in FIG. 3b), which correspond to collectors 36 and 38, respectively, of FIGS. 1, 2a and 2b. Stack 104 is oriented in the same direction as stack 102, and is provided with collectors 120, 122, which correspond to collectors 36, 38, respectively, of FIGS. 1, 2a and 2b. In order to connect stacks 102, 104 in parallel, collector 116 is electrically connected to collector 120, by a suitable electrical connecting element 124, which may be a high temperature metal connecting wire or rod, fabricated, for example, from nickel material. Collectors 118 and 122, are, in turn, connected to each other by a similar electrical connecting element 126. Electrical leads 128, 130, which may be connected to collectors 120, 122, respectively, may connect stack 100 to a current take off or to other stacks (not shown in FIG. 3b).

In the embodiments of FIGS. 3a and 3b, partially electrochemically utilized fuel from one stack enters a subsequent stack arranged in series for additional electrochemical reaction to improve the electrochemical efficiency of the overall module.

It is to be understood that the principles of the apparatus as illustrated in FIGS. 3a and 3b, while illustrated in the embodiment of two stack single columns, could be equally applied to columns of more than two fuel cell stacks, without departing from the principles of the present invention.

FIGS. 4 and 5 schematically illustrate a two column SOFC module 200, in which each column (202, 204) has two SOFC stacks therein. Columns 202 and 204 are appropriately supported and surrounded by a housing, not shown, which may be of otherwise conventional configuration, and suitably provided with air and fuel in lets and outlets, and so on.

In each of FIGS. 4 and 5, fuel flow is parallel to the plane of the drawing, with fresh fuel entering from below, as illustrated, and spent fuel exiting from the top of each of columns 202, 204. Fresh combustion air, in a separate flow, in introduced from below, into a region in the housing between the columns, under some positive pressure, and passes through the stacks outwardly and to the sides of module 200, again, in direction which is parallel to the plane of the drawing as illustrated.

Within columns 202, 204, stacks 210, 212, 214, 216, may each be constructed in accordance with the embodiment of FIGS. 1, 2a and 2b, and are oriented on their sides, relative to the illustration of FIGS. 1, 2a and 2b. The positive (anode) collector of stack 212 is connected in series with the negative (cathode) collector of stack 210, via common current collector 220. Stacks 214 and 216 are likewise connected in series via common collector 222. Bus bar 230 connects the positive collectors of stacks 214 and 210 in parallel and leads externally to module 200, while bus bar 232 connects the negative collectors of stacks 212 and 216 in parallel and leads externally to module 200. As discussed with respect to FIGS. 3a and 3b, the number of columns, and stacks within each column, may be readily changed to include greater or lesser numbers of each, by one of ordinary skill in the art having this disclosure before them, without departing from the scope of the invention.

The stacks in each column as illustrated in FIGS. 4 and 5 are connected in electrical series with the current collector trough arrangement as described herein; the columns are connected in parallel electrically. Alternatively (not shown), the stacks in each level may be connected in parallel electrically to neighboring stacks at the same level, in adjacent columns. That is, the first stack in a column will be connected electrically in parallel to the first stack in a neighboring column, and the second stacks in the columns are, in turn, connected electrically parallel, and so on. The stacks in a give column will be connected in electrical series.

FIG. 6 illustrates schematically a four column SOFC module 300, in which four columns 302, 304, 306, and 308, are arranged in a housing (not shown) around a plenum which forms the fresh air inlet. The method of electrical connections and the physical arrangement of the stacks within the columns may be readily understood as being according to the principles discussed with respect to the preceding figures.

While the present invention has been disclosed with respect to a fuel cell employing gaseous fuel and an oxidizing gas, the apparatus disclosed herein may be adapted by one of ordinary skill in the art having the disclosure before them, to a fuel cell employing liquid fuel and an oxidizing liquid, without departing from the basic principles and scope of the present invention.

The foregoing description and drawings merely serve to illustrate the invention and the invention is not limited thereto except insofar as the appended claims are so limited, as those skilled in the art who have the disclosure before them will be able to make modifications and variations therein without departing from the scope of the invention.

We claim:

1. A fuel cell apparatus, comprising:

at least one electrolyte member having at least two sides, including two opposed sides;

means for directing a flow of fluid across at least one of the two opposed sides of the at least one electrolyte member;

means, operably associated with the at least one electrolyte member, for conducting electrical current to positions physically removed from the at least one electrolyte member, in isolation from the fluid flow passing over at least one of the two opposed sides of the at least one electrolyte member;

means for collecting electrical current from the means for conducting electrical current, operably associated with the means for conducting electrical current;

means, operably associated with the means for collecting electrical current, for protecting the means for collecting electrical current.

2. The fuel cell apparatus according to claim 1, wherein the at least one electrolyte member is a substantially planar electrolyte member, and the means for directing a flow of fluid over at least one of the two opposed sides of the electrolyte member comprises at least one flow directing member operably positioned adjacent to at least one of the two opposed sides of the electrolyte member, having one or more fluid flow passages arranged therein, one or more of the one or more fluid flow passages opening onto the at least one side of the electrolyte member, so as to enable contact between the flow of fluid and the at least one of the two opposed sides of the electrolyte member.

3. The fuel cell apparatus according to claim 2, wherein the means, operably associated with the at least one electrolyte member, for conducting electrical current to positions physically removed from the at least one electrolyte member, in isolation from the fluid flow passing over at least one of the two opposed sides of the at least one electrolyte member, comprises at least one electrically conducting member, operably disposed in contact with one of the two sides of the at least one electrolyte member, and having at least one surface region disposed in spaced relation to the one of the two sides of the at least one electrolyte member, the at least one surface region further being isolated from the flow of fluid across the one side of the at least one electrolyte member.

4. The fuel cell apparatus according to claim 3, wherein the means for collecting electrical current comprises at least one current collector member operably disposed adjacent to and in electrical contact with the at least one surface region of the electrically conducting member.

5. The fuel cell apparatus according to claim 4, wherein the means, operably associated with the means for collecting electrical current, for protecting the means for collecting electrical current comprises means for covering and substantially enclosing the at least one current collector member, so as to substantiality preclude exposure of the at least one current collector member to oxidizing fluid.

6. The fuel cell apparatus according to claim 5, wherein the means for covering and substantially enclosing the at least one current collector member further comprises means for directing flow of a non-oxidizing fluid over the at least one current collector member.

7. The fuel cell apparatus according to claim 6, wherein the means for covering and substantially enclosing the at least one current collector member further comprises at least one cover member, having a fluid flow channel operably disposed on one side thereof, the at least one cover member being operably disposed substantially adjacent to the at least one surface region of the at least one electrically conducting member, with the side of the at least one cover member having the flow channel disposed therein facing the at least one surface region, such that the at least one current collector member is substantially received within the at least one fluid flow channel.

8. The fuel cell apparatus according to claim 7, wherein the at least one cover member is fabricated from an electrically conductive material.

9. The fuel cell apparatus according to claim 4, wherein the at least one current collector member is fabricated from a metal material including nickel.

10. The fuel cell apparatus according to claim 3, wherein the means for directing a flow of fluid over at least one of the two opposed sides of the at least one electrolyte member and the means for conducting electrical current to positions physically removed from the at least one electrolyte member further comprise at least one monolithically fabricated electrically conducting interconnector member, having a first side having two or more flow directing members associated therewith to define at least one fluid flow passage disposed thereon the first side, and at least one surface region operably disposed on a second side substantially opposite the first side, the at least one electrically conducting interconnector member being operably arranged relative to the at least one electrolyte member such that the first side of the at least one electrically conducting member is positioned facing one of the two sides of the at least one electrolyte member, the two or more flow directing members being in electrically conducting contact with the one of the two sides of the at least one electrolyte member.

11. The fuel cell apparatus according to claim 7, further comprising means for regulating the flow of fluid through the at least one fluid flow channel in the at least one cover member.

12. The fuel cell apparatus according to claim 7, wherein the at least one electrolyte member includes at least two electrolyte members, further comprising at least one electrically conductive interconnector member operably disposed between the at least two electrolyte members.

13. A current collector apparatus for collecting the electrical current generated by the one or more electrolytes in a fuel cell, which is powered by supplies of fuel fluid and oxidizing fluid directed to opposed sides of the one or more electrolytes, the current collector apparatus comprising:

at least one current collector member, operably disposed in electrically conductive relation to at least one side of at least one of the one or more electrolytes in the fuel cell; and means, operably associated with the at least one current collector member, for shielding the at least one current collector member from contact with oxidizing fluid.

14. The current collector apparatus according to claim 13, wherein the fuel and oxidizing fluids are directed past the sides of the at least one electrolyte members by fluid directing members extending along the sides of the at least one electrolyte member, the means for shielding the at least one current collector member comprises a substantially planar member, having a surface region thereon, and operably disposed between the fluid directing members and the at least one current collector member, with the at least one current collector member positioned adjacent to and in electrical contact with the surface region, so as to substantially contain the fluid flowing past the sides of the at least one electrolyte member, the fluid directing members and the substantially planar member being electrically conductive.

15. The current collector apparatus according to claim 14, wherein the means for shielding the at least one current collector member further comprises at least one cover member, operably configured so as to be positioned substantially adjacent to and over the surface region and the at least one current collector member positioned thereon, so as to substantially surround same.

16. The current collector apparatus according to claim 15, wherein the at least one cover member has a fluid passage disposed therein for receiving and surrounding the at least one current collector member and enabling the passage of a non-oxidizing fluid therein.

17. The current collector apparatus according to claim 16, wherein means for regulating fluid flow are operably disposed within the fluid passage in the at least one cover member.

* * * * *